United States Patent [19]

Sobhani et al.

[11] Patent Number: 4,877,972

[45] Date of Patent: Oct. 31, 1989

[54] FAULT TOLERANT MODULAR POWER SUPPLY SYSTEM

[75] Inventors: Seyd M. Sobhani; Raldon M. Smith, both of Renton, Wash.

[73] Assignee: The Boeing Company, Seattle, Wash.

[21] Appl. No.: 209,506

[22] Filed: Jun. 21, 1988

[51] Int. Cl.[4] .................... H02M 3/335; H02J 1/00
[52] U.S. Cl. .................................. 307/43; 307/34; 307/64; 307/66; 307/82; 307/87; 361/93; 323/906
[58] Field of Search .................... 307/34"41, 307/64, 66, 82, 83, 84, 85, 86, 87; 363/49, 47; 361/90, 91, 92, 93, 89; 364/200, 492; 323/906, 23, 19, 272

[56] References Cited

U.S. PATENT DOCUMENTS

| | | | |
|---|---|---|---|
| 3,156,855 | 11/1964 | Righton et al. | 318/19 |
| 3,219,913 | 11/1965 | Brown | 323/23 |
| 3,353,092 | 11/1967 | Rubin | 323/19 |
| 3,480,789 | 11/1969 | Binckley et al. | 307/53 |
| 3,600,599 | 8/1971 | Wright et al. | 307/53 |
| 3,652,798 | 3/1972 | McNeilly et al. | 179/15 AL |
| 3,696,286 | 10/1972 | Ule | 307/66 X |
| 3,986,101 | 10/1976 | Koetsch et al. | 307/82 X |
| 4,048,446 | 9/1977 | Hafner et al. | 179/15 AL |
| 4,074,146 | 2/1978 | Buonavita | 307/60 |
| 4,075,440 | 2/1978 | Laubengayer | 179/175.3 S |
| 4,136,286 | 1/1979 | O'Halloran et al. | 307/87 X |
| 4,186,336 | 1/1980 | Weinberg et al. | 323/906 X |
| 4,270,165 | 5/1981 | Carpenter et al. | 307/82 X |
| 4,359,679 | 11/1982 | Regan | 323/272 |
| 4,392,199 | 7/1983 | Schmitter et al. | 364/200 |
| 4,461,690 | 7/1984 | Rolff et al. | 307/34 X |
| 4,476,399 | 10/1984 | Yoshida et al. | 307/44 |
| 4,539,486 | 9/1985 | Saito et al. | 307/34 |
| 4,539,487 | 9/1985 | Ishii | 307/64 X |
| 4,645,940 | 2/1987 | Wertheim | 307/66 |
| 4,659,942 | 4/1987 | Volp | 307/19 |
| 4,672,226 | 6/1987 | Sutherland | 307/43 |
| 4,761,705 | 8/1988 | Larry et al. | 361/93 |
| 4,766,364 | 8/1988 | Biamonte et al. | 307/82 X |

FOREIGN PATENT DOCUMENTS

5773429 10/1980 Japan .
935914 11/1980 U.S.S.R. .

Primary Examiner—William M. Shoop, Jr.
Assistant Examiner—Paul Ip
Attorney, Agent, or Firm—Christensen, O'Connor, Johnson & Kindness

[57] ABSTRACT

A modular power supply system in which a plurality of power supply modules connected in parallel to a load contribute equal currents, even if one or more of the power supply modules fails. A first order fault tolerant modular power supply system includes three power supply modules (38, 40 and 42) connected in parallel to a load (32). The output current from each of the power supply modules is separately compared to the output current from one of the other power supply modules in a loop arrangement, using three control circuits (64, 66 and 68). A signal indicative of the current contributed by each pair of the power supply modules is input to the control circuit, producing a differential output signal used as a reference to control the output current from each of the power supply modules. Failure of any one of the modules does not affect the ability of the system to continue to supply substantially equal currents from the remaining two operating modules, so long as the total rated capacity of the power supply modules continuing to operate is not exceeded. Second and third order fault tolerant modular power supply systems (400 and 500) are also disclosed.

21 Claims, 3 Drawing Sheets

FAULT TOLERANT MODULAR POWER SUPPLY SYSTEM

TECHNICAL FIELD

This invention generally pertains to a power supply system and, specifically, to a power supply system in which a plurality of power supply modules are connected to supply current to a common load.

BACKGROUND OF THE INVENTION

For most applications, a single power supply is selected that has a rated output current capacity sufficient to accommodate the maximum expected current demand of the load to which it is connected. However, there is a clear advantage in supplying the current from a plurality of power supply modules, instead of from a single source, particularly if the total load current is relatively high. Perhaps the most significant advantage of a modular power supply system is the substantial improvement in reliability. If any one of the modular power supply sources connected in parallel to the load should fail, the remaining sources can continue to provide the required current, so long as the total rated capacity of the remaining sources is not exceeded. In addition, a single source is generally more expensive than several smaller power supplies having an equivalent total rated capacity, due to the much lower cost of the components used to manufacture the smaller power supplies.

Unfortunately, achieving the ideal modular power supply system is more difficult than it may initially appear. Even nominally identical voltage regulated power supplies have small variations in their output voltage, and as a result, if connected in parallel, do not provide equal current to the load. Connection of the power supply modules in parallel causes their voltage regulation circuits to interact. The source having the highest output voltage tends to provide more current, causing the other sources to respond by further reducing their output voltage. The problem is even worse with power supply modules not provided with voltage regulation. Since the current contributed by each power supply module is not equal, the system operates inefficiently, often with unacceptable losses.

A modular power supply system should also include means for controlling regulation of the parallel connected modular power supplies in the event of a failure of one of the modules. If there are N power supply modules in a system, and K modules fail, it is desirable that the remaining N−K modules continue to share the load current equally. This condition is called fault tolerance of the Kth order.

In a conventional scheme for controlling parallel power supplies, a feedback control circuit is provided for every module. The control circuitry assigned to the Kth module compares the current output from that module to the average current of the system and adjusts the output voltage of the Kth module correspondingly. This approach is referred to as "automatic current sharing."

The above-described prior art system for connecting power supplies in parallel to share current is cumbersome and inadequate for systems in which more than a few modular power supplies are used, because each of the modules must be provided with a control signal comprising the average current provided by all the modules in the system. Thus, it is necessary for each power supply module to communicate with every other module to determine the number of modules that are still functioning and to determine the average current. Further, since the averaging circuitry must be able to adapt as the number of functioning modules in the system changes, it tends to be unduly complex.

In consideration of the above problems, it is an object of the present invention to properly regulate the current supplied by each modular source in a system of parallel connected power supplies, so that each source supplies equal current to the load even though one or more of the sources fails, and to achieve this result without averaging the current supplied by all the modules. This and other objects and advantages of the present invention will be apparent from the attached drawings and the description of the preferred embodiments that follow.

SUMMARY OF THE INVENTION

A fault tolerant power supply system is provided that includes a plurality of power supplies having the same nominal output voltage, which are connected in parallel to supply current to a load. Current monitoring means associated with each of the power supplies are provided to monitor the current supplied to the load by the power supplies, producing a signal corresponding to the magnitude of that current for each power supply. Comparator means, connected to the current monitoring means and responsive to the signals they produce, are operative to determine the difference between the current supplied by each power supply and at least one other power supply in the system, producing a plurality of differential signals corresponding to those differences. The differential signals each serve as a reference signal to control the output current of one of the power supplies, causing the output currents of the power supplies to change until they are substantially equal.

The comparator means comprise a plurality of differential amplifiers, interconnected in a loop, each differential amplifier being associated with one of the power supplies and being connected to receive the signals produced by the current monitoring means associated with that one power supply and with at least one other power supply. The differential amplifiers compare the signals produced by the current monitoring means, producing the differential signals as a function of the difference between the signals. With respect to a second order fault tolerant embodiment, if a power supply fails, the signal produced by a current monitoring means associated with at least one power supply preceding the failed power supply in the loop is compared to the signal produced by a current monitoring means associated with the power supply following the failed power supply in the loop.

In one preferred embodiment, each differential amplifier compares the signals produced by current monitoring means associated only with a pair of the power supplies. Another preferred embodiment includes N power supplies, and the signals produced by current monitoring means associated with M power supplies are connected to each differential amplifier. Even if any M−1 power supplies fail, the currents provided to the load by the remaining operating power supplies continue to be substantially equal, so long as the load current does not exceed the total rated current capacity of the operating power supplies.

A method for carrying out the steps substantially as implemented by the above-described fault tolerant power supply system is another aspect of this invention.

DISCLOSURE OF THE PREFERRED EMBODIMENTS

Figure 4:
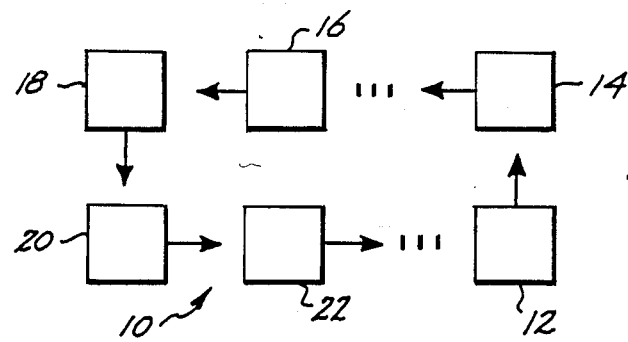
FIG. 4 is a diagram generally illustrating the loop control scheme used in the present invention.

Turning first to FIG. 4, a simplistic representation of a fault tolerant modular power supply system is generally denoted by reference numeral 10. In modular power supply system 10, a plurality of either identical or nonidentical power supply modules 12 through 22 are connected in parallel to supply current to a common load (not shown). The output voltage of each of the power supply modules is nominally regulated to the same value, and would normally be regulated with respect to an internal reference voltage within each module. However, in accordance with the present invention, the power supply modules are modified so that their output voltage is adjusted by a control circuit associated with each module (not separately shown). The control circuit insures that each power supply module contributes an output current equal to the output current of the preceding power supply module in sequence around the loop. For example, power supply module 14 is controlled to insure that it contributes an output current equal to that of power supply module 12. Similarly, each of the power supply modules between power supply modules 14 and 16 produces an output current equal to that of the output current of the preceding module. This pattern continues around the loop, closing with module 12, which produces an output current equal to that of power supply module 22.

Accordingly, the output currents of each of the power supply modules in the loop are substantially equal, as are the output voltages. The output voltage of each power supply module is equal to the average, $V_A$, of the output voltages produced by the individual power supply modules if connected to the same load, but not controlled with respect to the output current of another power supply module. Averaging circuitry is not required to determine the average output voltage, as in the prior art.

The equal-sharing of load current by the operating power supply modules continues even if one of the modules fails, although the current contribution of each module then increases. For example, if power supply module 18 fails, the output current of the remaining operating power supply modules increases to compensate the loss of its contribution. Since reference to the output current of power supply module 18 is no longer possible, the control circuit causes module 20 to regulate its output according to its internal fixed default voltage reference. As a result, module 22 is forced to adjust its output voltage until it pushes the same current as module 20. Similarly, the control circuit associated with each of the succeeding power supply modules after power supply module 22 in the loop tracks the output current of an immediately preceding power supply module, so that the current each produces is equal. Power supply system 10 stabilizes when the output current contributed by each of the operating power supply modules equals that output by power supply module 20. Since the closed loop is broken due to the failure of power supply module 18, all operating power supply modules have an output voltage equal to that of power supply module 20, which is not equal to the average output voltage, $V_A$.

Figure 1:
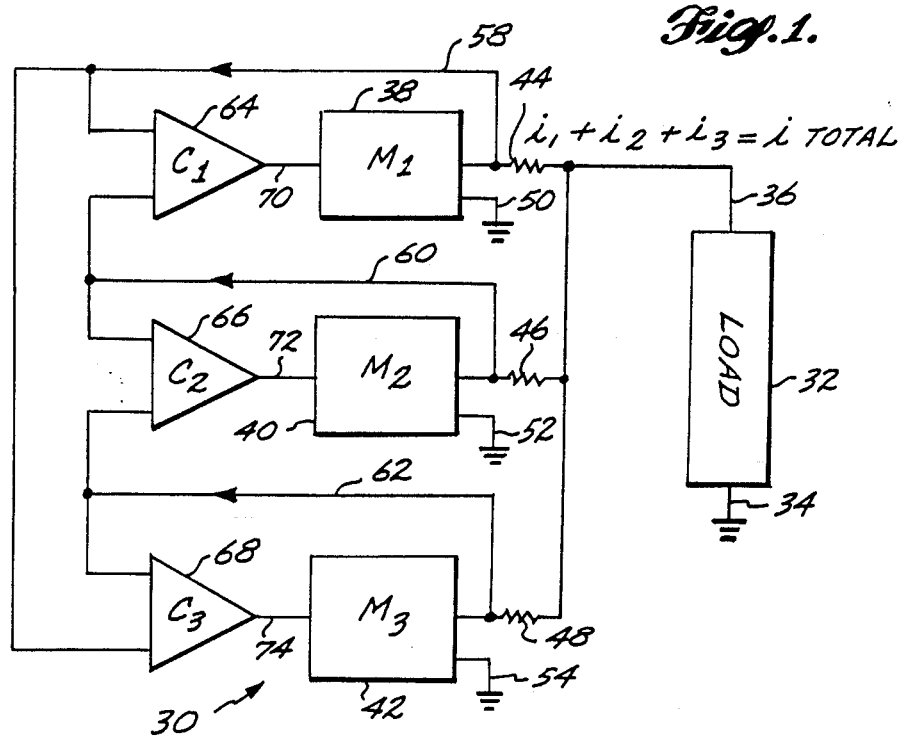
FIG. 1 is a schematic block diagram illustrating a first embodiment of the fault tolerant power supply system.

A more specific embodiment of a fault tolerant power supply comprising three power supply modules is identified in FIG. 1 by reference numeral 30. Power supply system 30 provides a total current, $I_{total}$, to a load 32. The current I total is equal to the combined output currents, $I_1+I_2+I_3$, of three power supply modules 38, 40 and 42, respectively. The current supplied load 32 returns to ground via a lead 34, and each of power supply modules 38 through 42 have their output current referenced to ground through leads 50, 52 and 54, respectively. In a conventional power supply system comprising parallel connected power supply modules, the contribution of each power supply module to the total current supplied to load 32 over lead 36 would generally not be equal because the output voltages of the modules would differ slightly, following a load line unique to each module. However, in power supply system 30, each of the modular power supplies contributes an equal share of the total current, since each tracks the output current of another.

A sense resistor 44 is connected in series with the output of modular power supply 38 and lead 36; similarly, sense resistors 46 and 48 are connected in series between the outputs of power supply modules 40 and 42 and lead 36. Sense resistors 44, 46 and 48 are equal in value, having a relatively low resistance, on the order of 1.0 ohm or less, and have a rated current capacity in excess of that of each of the modular power supplies. Sense leads 58, 60 and 62 are respectively connected at the outputs of each of the modular power supplies to sense resistors 44 through 48, and provide a sense signal input to control circuits 64, 66 and 68. Specifically, sense lead 58 is connected as an input to control circuits 64 and 68; sense lead 60 is connected to control circuits 64 and 55; and sense lead 62 is connected to control circuits 66 and 68.

Control circuit 64 compares the voltage drop across sense resistor 44 with the voltage drop across sense resistor 46. The voltage drop across resistors 44 and 46 varies respectively with the current output from power supply modules 38 and 40. The difference between the output currents of power supply modules 38 and 40 results in a difference signal that is input to power supply module 38 over lead 70. This difference signal is used as a reference to adjust the output voltage of power supply module 38, until the voltage drop across sense resistor 44 equals the voltage drop across sense resistor 46, indicating that the output current of modular power supply 38 is equal to the output current of modular power supply 40.

Similarly, control circuit 66 produces a difference signal that is input to power supply module 40 over lead 72, causing that power supply module to adjust its output current to equal that of power supply module 42; and control circuit 68 produces a difference signal that is input to power supply module 42 over lead 74, causing the power supply to adjust its output current to equal that of power supply module 38. Since the power supply modules each successively track the output current of the preceding power supply module, the output currents of each are substantially equal, as are their output voltages. The output voltage of the power supply modules is again equal to what would be the average of the output voltages of the individual power supply modules if they were connected to the same load, but not controlled with respect to the output current of another module.

Power supply system 30 is a first order fault tolerant system, in that any one of the power supply modules 38 through 42 may fail, without degrading the ability of the system to effect substantially equal current contribution from the remaining power supply modules, so long as the current required by load 32 does not exceed the total rated capacity of the remaining two power supply modules. Details of the manner in which the power supply system 30 and other embodiments compensate for failure of one or more of the power supply modules are explained hereinbelow.

Figure 2:
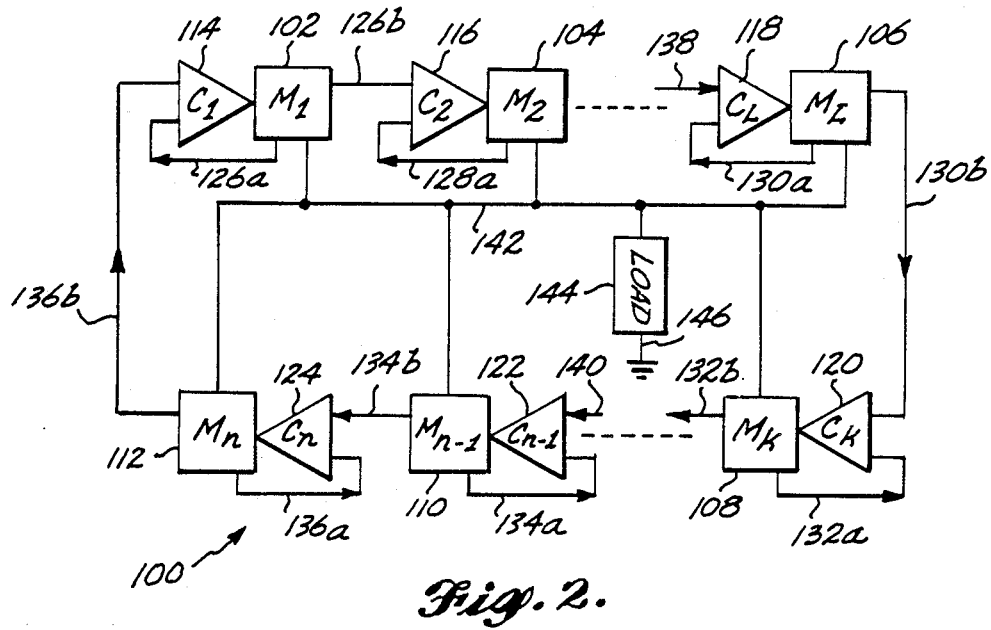
FIG. 2 is a schematic block diagram illustrating a more generalized embodiment of the present invention.

A more generalized fault tolerant power supply system 100 is shown in FIG. 2. Power supply system 100 is similar to power supply system 30; however, it includes N power supply modules $M_1$ through $M_N$, reference numerals 102 through 112, producing output currents controlled by control circuits $C_1$ through $C_N$, reference numerals 114 through 124. Power supply module ($M_1$) 102 is controlled by control circuit ($C_1$) 114, so that it produces an output current as a function of a reference signal corresponding to the differential between a sense signal conveyed over a lead 126a from power supply module 102 and a sense signal conveyed over a lead 136b from power supply module ($M_N$) 112. Power supply module ($M_2$) 104 contributes a current controlled as a function of the differential between a sense signal input to control circuit ($C_2$) 116 by a lead 128a from power supply module $M_2$ and a sense signal input from power supply module $M_1$ over a lead 126b. The sense signals on leads 126a and 136b, and 128a and 126b, represent the current output from the above-indicated power supply modules. A circuit element internal to each module produces a DC signal that varies as a function of the output current. The sense signals may be derived, for example, by sensing line current input to a module, or any other parameter within the internal circuitry of the modules that is indicative of the current supplied by each power supply module to the load.

A succession of modular power supplies are included in the loop between power supply module ($M_2$) 104 and power supply module ($M_L$) 106, each of which are controlled as a function of the differential between sense signals supplied from that power supply and the preceding power supply module in the loop. For example, since a power supply module ($M_K$) 108 follows power supply module ($M_L$) 106, its output current is controlled so that it is equal to the output current of power supply module $M_L$, as a function of the sense signals provided to control circuit 120 over leads 130b and 132a. The loop continues through power supply modules ($M_{N-1}$) 110 and ($M_N$) 112, closing by referencing the output current of power supply module ($M_1$) 102 against that of module 112.

The output current from each of the power supply modules comprising the loop is connected to a common conductor 142 that supplies current to a load 144. The other side of the load is connected to ground through a lead 146. Although only a single load 44 is shown, it will be understood that a distributed load may also be used for this and all other embodiments of the present invention. The power supply modules equally share the power supplied to the load, having equal output currents and output voltages. While power supply system 100 operates as a closed loop, the output voltage is equal to the average of the output voltages of the individual power supply modules if connected to the same load, but not referenced to the output current of another module.

As explained above, each of the power supply modules is controlled by reference to the output current from a preceding power supply module in the closed loop. However, if one of the power supply modules fails, the loop is broken and the contribution of each of the remaining power supply modules to the total current supplied to a load 144 increases. The power supply module following the failed power supply module in the loop establishes the new level of output current, while each power supply module should supply, and each successive power supply module following that module is still controlled with respect to the output current supplied by the preceding power supply module in the loop. For example, if power supply module 110 fails, the sense signal representing its output current that is carried over lead 134b goes to zero. Loss of the sense signal on lead 134b causes the output voltage of power supply module 112 to be controlled with respect to its internal fixed voltage reference signal instead of the differential signal from control circuit 124. Power supply module 102 is controlled by the reference signal produced by control circuit 114 in response to the sense signal input over leads 126a and 136b, so that its output current matches that of power supply module 112. Each of the remaining operating power supply modules provides an equivalent current by virtue of their reference to the output current of the preceding power supply module in the loop. The output voltage is determined by the load line of power supply module 112 and is not necessarily equal to the previously described average output voltage for the closed loop system.

Figure 3:
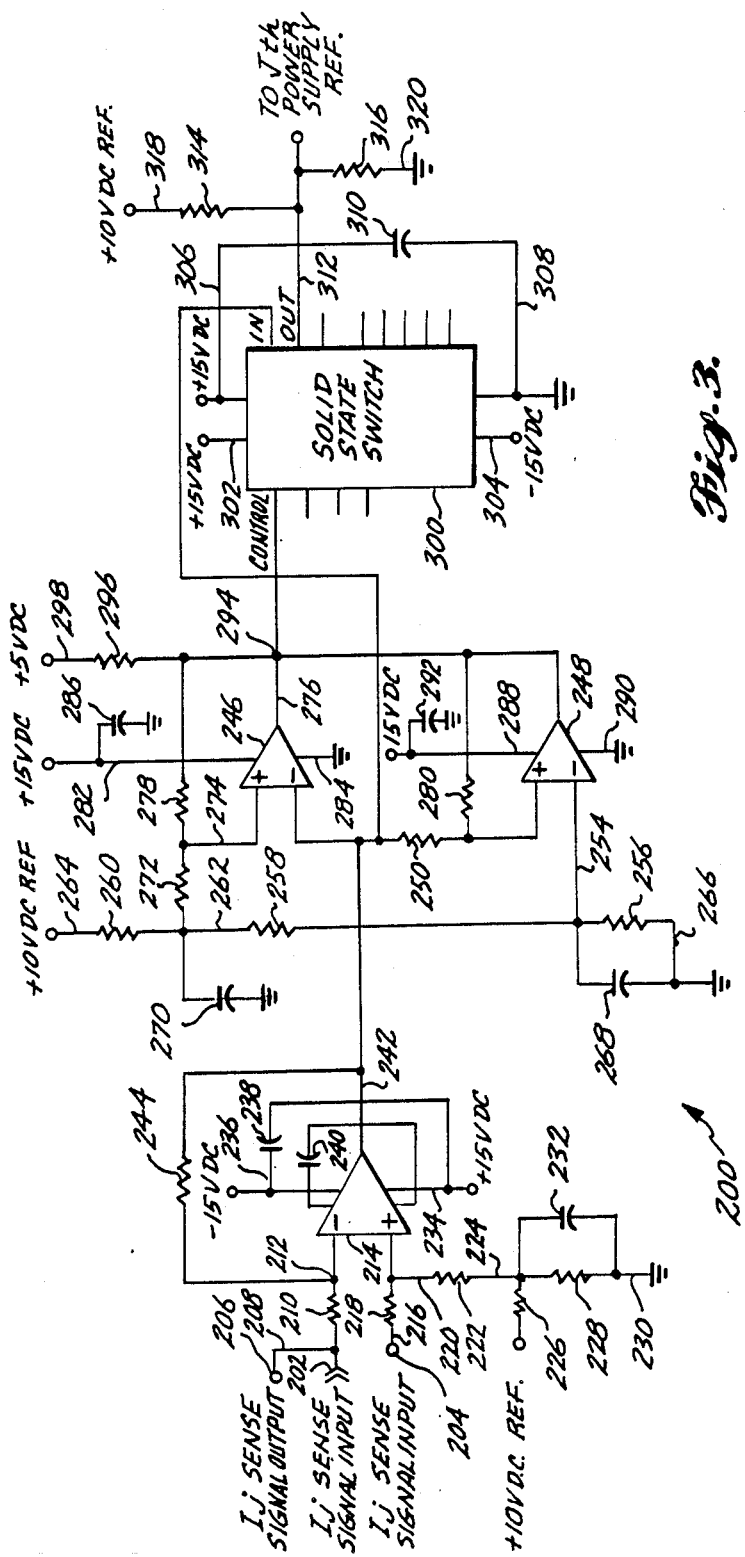
FIG. 3 is an electrical schematic diagram of a control circuit for a power supply, typical of the control circuit used for each of the other power supplies in the fault tolerant power supply system.

Details of a typical control circuit 200 are disclosed in FIG. 3. Control circuit 200 is used to control the output current of an arbitrary Jth power supply module in modular power supply system 100, where J is an integer in the sequence 1 through N. A sense signal indicative of the current output from the Jth power supply module is input at terminal 202 for comparison against a sense signal indicative of the current supplied by the preceding J−1 power supply module, which is input to a sense signal input terminal 204. The current output from the Jth module is identified as $I_j$, while the current output from the J+1 power supply module is identified as $I_{j+1}$. The sense signal input on terminal 202 is provided on terminal 206 to control the next, i.e., the J+1 power supply module.

Input terminal 202 is connected to output terminal 206 and to an input resistor 210 by a lead 208. The other side of input resistor 210 is connected to the inverting input of a differential operational amplifier (OP AMP) 214 by a lead 212. Input terminal 204 is connected by a lead 216 to an input resistor 218, the other side of the resistor being connected to the noninverting terminal of OP AMP 214 by a lead 220. Lead 220 is also connected to an input resistor 222. A reference voltage derived from a voltage divider comprising two resistors 226 and 228, is connected as an input to resistor 222 by a lead 224. The voltage divider is connected between a +10 volt DC regulated reference (not shown) and a grounded lead 230. In the preferred embodiment, the values of the two voltage divider resistors 226 and 228 are equal, so that the output voltage from the center tap of the divider is 5 volts DC. a noise filtering capacitor 232 is connected in parallel with resistor 228.

The 5 volts DC input to OP AMP 214 through resistor 222 establishes a 5 volt offset on the output of the OP AMP, about which its output signal varies as a function of the differential voltage between the sense signal inputs at 202 and 204. The output signal from the OP AMP appears on an output lead 242, and is also thereby connected to a feedback resistor 244, the other side of which is connected to the inverting input at lead 212. The ratio of the resistance of resistor 244 to that of input resistor 210 determines the gain of OP AMP 214. In the preferred embodiment, the resistances are equal, so that the gain is unity. A loop compensation capacitor 240 is connected to OP AMP 214, and a power supply decoupling capacitor 238 is connected between a −15 volt DC supply input to the OP AMP over a lead 236 and a +15 volt DC supply input via a lead 234; neither of the 15 volt DC supplies are separately shown, since they are of conventional design.

The signal output from OP AMP 214 is coupled to a window detector circuit comprising comparators 246 and 248. The output signal from OP AMP 214 is conveyed over output lead 242 to the inverting input of comparator 246 and to an input resistor 250, the other end of which is connected by a lead 252 to the noninverting input of comparator 248. The inverting input of comparator 248 is connected by a lead 254 to a voltage divider circuit comprising resistors 256, 258 and 260. These three resistors are connected in series between the +10 volt DC reference and ground potential. Resistor 260 is connected to the +10 volt DC reference by a lead 264 and resistor 256 is connected to ground by a lead 266. Lead 254 connects resistors 256 and 258, the other side of resistor 258 being connected to resistor 260 by a lead 262. The values of resistors 256, 258 and 260 determine both the upper and lower limits and thus, the width of the window, and in the preferred embodiment are selected so that the input potential connected to comparator 248 by lead 254 is equal to 4.9 volts DC, while the input potential connected to the noninverting input of comparator 246 through an input resistor 272 is equal to 5.1 volts DC. Comparator 246 is connected to the 15 volt DC supply by a lead 282 and to ground potential by a lead 284. A decoupling capacitor 286 is connected between lead 282 and ground. Comparator 248 is connected to the 15 volt DC supply by lead 288 and to ground potential by lead 290. A decoupling capacitor 292 is connected between lead 288 and ground.

The noninverting input to comparator 246 is connected to input resistor 272 by a lead 274, and thus to a feedback resistor 278, the other side of which is connected to the output of comparator 246 by a lead 276. Similarly, the output of comparator 248 is connected to lead 276 and to a feedback resistor 280 that is connected between lead 276 and lead 252. Both feedback resistors 278 and 280 are relatively large valued resistors (one megohm is the preferred embodiment), to provide a small amount of hysteresis to each of comparators 246 and 248. The two comparators operate in a current sinking mode only if the potential of the signal input to the noninverting terminal of the comparator is greater than that applied to the inverting terminal. In the preferred embodiment, so long as the signal output from OP AMP 214 is in the range between 4.9 volts DC and 5.1 volts DC, neither comparator 246 nor comparator 248 operates in a current sinking mode. However, if the signal output from OP AMP 214 is less than 4.9 volts DC, comparator 248 operates as a sink for current supplied from a 5 volt DC source that is connected to a current limiting resistor 296 by a lead 298. The other side of resistor 296 is connected to lead 276, and thus to the outputs of each of comparators 246 and 248. If the output of OP AMP 214 rises above 5.1 volts DC, comparator 246 begins to sink current supplied through resistor 296. An "OR" node 294 is disposed at the common connection between the outputs of comparators 246 and 248. The DC potential on OR node 294 is 5 volts when the output signal from OP AMP 214 is within the differential window, i.e., within the range from 4.9 to 5.1 volts DC, but drops to approximately zero volts DC if the output voltage of OP AMP 214 is either less than 4.9 volts DC or greater than 5.1 volts DC.

The signal output from OP AMP 214 is also connected to the input of a solid state switch 300, which is controlled by the voltage at OR node 294. Solid state switch 300 is connected to the +15 volt DC supply by a lead 302 and to the 15 volt supply by a lead 304. A 5 volt DC supply is connected to the solid state switch by a lead 306, and ground potential is connected to the switch by a lead 308. Connected between leads 306 and 308 is a decoupling capacitor 310. An output terminal from solid state switch 300 is connected by a lead 312 to a voltage divider circuit comprising resistors 314 and 316, which are connected to the 10 volt DC reference by a lead 318 and to ground potential by a lead 320. Lead 312 connects to both resistors 314 and 316. In the preferred embodiment, these two resistors are precision resistors of equal value. The output voltage of the voltage divider is thus 5 volts DC.

Solid state switch 300 is controlled by the signal input from OR node 294; it conducts the output signal from OP AMP 214 to output lead 312, so long as the voltage on OR node 294 is approximately equal to 5 volts DC. However, if either comparator 246 or comparator 248 begins to sink current from resistor 296 because the output signal from OP AMP 214 has fallen below 4.9 volts DC or risen above 5.1 volts DC, then the voltage at OR node 294 drops to approximately zero, causing solid state switch 300 to "open." When solid state switch 300 "opens," the voltage on lead 312 assumes the default 5 volts DC level of the voltage divider comprising resistors 314 and 316.

It should be apparent that the output signal on lead 312 that is applied as a reference to the Jth power supply module is modulated in the range between 4.9 volts DC and 5.1 volts DC, as a function of the differential between the $I_j$ and $I_{j-1}$ sense signals input to OP AMP 214. Should the differential signal from the OP AMP fall outside the 5.0±0.1 volt DC window, the reference signal changes to a default 5 volts, provided by the voltage divider comprising resistors 314 and 316. This 5 volt nominal reference signal ensures that the Jth power supply module has a reliable reference level, even if the $I_{j-1}$ sense signal should rise or fall excessively due to a failure of the J−1 power supply module.

Figure 5:
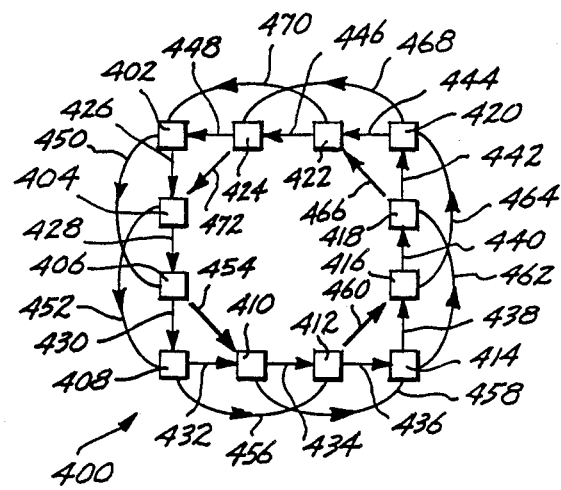
FIG. 5 is a block diagram illustrating a second order fault tolerant embodiment of the present invention.

Referring now to FIG. 5, a second order modular power supply system is shown, generally denoted by reference numeral 400. The load, the output current circuit, and the control circuit of each of power supply modules 402 through 424 comprising power supply system 400 are not shown in FIG. 5. The figure is simply intended to illustrate schematically how the output current of each power supply module is referenced to the two preceding power supply modules in a loop. The reference to an immediately preceding power supply module in the loop is accomplished by use of first order sense leads 426 through 448 which connect the control circuit of each power supply module 402 through 424 to its immediately preceding power supply module. For example, the control circuit of power supply module 402, which is disposed in the upper left corner of the loop shown in FIG. 5, is referenced to the output current of an immediately preceding power supply module 424 by a first order sense lead 448. Module 402 also provides an output current reference to the control circuit of the next power supply module 404 in the loop, via a sense signal conveyed through a first order sense lead 426.

Second order sense leads 450-472 connect the control circuit of each power supply module to a power supply module two places back in the loop. For example, second order sense lead 470 provides an output current sense signal from power supply module 422 to the control circuit of power supply module 402, so that should power supply module 424 fail, the output current of power supply module 402 is referenced to the output current of power supply module 422. Any two power supply modules may fail at any point in the loop, and so long as the requirements of the load do not exceed the total rated current capacity of the remaining operating power supply modules, the second order modular power supply system is able to control the current provided by each power supply module that is operating, so that the currents supplied by the operating modules are substantially equal and their voltages are substantially equal. So long as the loop remains closed, the output voltage of the system equals the average of the output voltage of each of the separate remaining modules, if connected to the same load and referenced to their own internal load line. Of course, it will be apparent that more than two power supply modules may fail without affecting the ability of the system to maintain equal output currents under some circumstances. Further, if power supply modules having different current ratings are used, the module having the lowest rated current capacity determines the maximum current which each module may supply.

Figure 6:
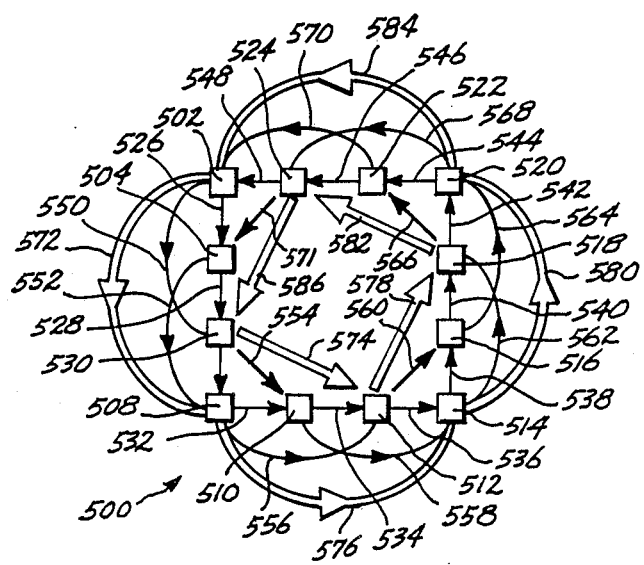
FIG. 6 is a block diagram illustrating a third order fault tolerant embodiment.

With reference to FIG. 6, a third order modular power supply system is shown comprising power supply modules 502 through 524. The control circuit of each power supply module is referenced to the output current of a preceding power supply module by first order sense leads 526 through 548, just as described with respect to the second order modular power system 400. Similarly, the control circuit of each power supply module is referenced to a power supply module two places back in the loop by second order sense leads 550 through 571. In addition, however, third order modular power supply system 500 includes third order sense leads 572 through 586, which provide a sense lead connection to reference the control circuit of each of the power supply modules to the output current of a module three places back in the loop. In the third order modular power supply system, any three power supply modules may fail without impacting the ability of the system to supply substantially equal currents at equal voltages from each of the remaining power supply modules, so long as the current requirement of the load does not exceed the total rated current capacity of the remaining operating power supply modules.

With reference to control circuit 200 shown in FIG. 3, a control circuit suitable for use in second order fault tolerant modular power supply system 400 is implemented by modifying the control circuit illustrated in FIG. 3 to include an additional sense signal input terminal and input resistor, like sense signal input terminal 204 and input resistor 218, which are connected to the noninverting input of OP AMP 214. In addition, an isolation diode is connected in series between each input terminal and the input resistor, with its anode connected to the input terminal. The noninverting input of the OP AMP only "sees" the highest positive sense signal input from each of the $I_{j-1}$ and $I_{j-2}$ power supply modules, so that the output signal on lead 242 is proportional to the differential between the current contributed by the Jth power supply module ($I_j$) and the higher of the current contributed by the J−1 and the J−2 power supply modules. However, the output current from the J−1 and J−2 modules should be equal under normal operation of the power system. Should either of those two modules fail, the output signal from OP AMP 214 continues to reflect the differential between the remaining operating power supply module and the Jth power supply module.

A control circuit suitable for use with the third order fault tolerant modular power supply system is obtained by adding yet a third sense signal input terminal, isolation diode and input resistor to provide another possible source to the noninverting input of the OP AMP. The current sense signal that has the highest positive potential is applied to the noninverting input of the OP AMP for comparison to the $I_j$ sense signal, but during normal operation of the system, all the sense signal inputs should be equal.

While the present invention has been described with respect to several preferred embodiments, it will be understood by those of ordinary skill in the art that modifications to these embodiments may be made within the scope of the claims that follow hereinbelow. Accordingly, it is not intended that the scope of the invention be limited by the disclosure, but that it be determined entirely by reference to the claims that follow.

The embodiments of the invention in which an exclusive property or privilege is claimed are defined as follows:

1. A fault tolerant modular power system comprising:
   (a) a plurality of power supplies, each having an output connected in parallel to supply current to a load, and each having the same nominal output voltage;
   (b) current monitoring means associated with each of the power supplies, for monitoring a condition indicative of the magnitude of the current output by each, and operative to produce a signal corresponding to the magnitude of said current; and
   (c) comparator means, connected to the current monitoring means and responsive to the signals said current monitoring means produce, for determining the difference between the current supplied by each power supply and at least one other power supply in the system that serves as a first order reference power supply, each power supply having a different first order reference power supply thereby producing a plurality of differential signals corresponding to said differences, each differential signal serving as a reference signal to control the output current of one of the power supplies causing the power supplies to have substantially equal output voltages and equal output currents.

2. The fault tolerant modular power system of claim 1, wherein the comparator means comprise a plurality of differential amplifiers interconnected in a loop, each differential amplifier being associated with one of the power supplies and connected to receive the signals produced by the current monitoring means associated with said one power supply and with at least one other power supply, producing the differential signals as a function of the difference between the signals.

3. The fault tolerant modular power system of claim 2, wherein each differential amplifier compares the signals produced by current monitoring means associated with successive power supplies in the loop, and wherein if a power supply fails, the signal produced by the current monitoring means associated with at least one power supply preceding the failed power supply in the loop is compared to the signal produced by the current monitoring means associated with a power supply following the failed power supply in the loop.

4. The fault tolerant modular power system of claim 2, wherein there are N power supplies, and the signals produced by the current monitoring means associated with M power supplies are connected to each differential amplifier, failure of any $M-1$ power supplies not affecting the capacity of the remaining operating power supplies to provide substantially equal currents to the load, so long as a total rated current capacity of the remaining operating power supplies is not exceeded.

5. The fault tolerant modular power system of claim 2, wherein each differential amplifier compares the signals produced by current monitoring means associated only with a pair of the power supplies.

6. The fault tolerant modular power system of claim 1, further comprising control means for defining a range for the differential signal between predefined upper and lower limits in which the differential signal serves as the reference signal of an associated power supply, and for producing a default reference signal to control the output current of the associated power supply if the differential signal is outside said range.

7. The fault tolerant modular power system of claim 1, wherein the current monitoring means comprise a plurality of resistors, each connected to the output of one of the power supplies, the signals produced by the current monitoring means corresponding to the voltage drop across the resistors.

8. A fault tolerant modular power system comprising:
(a) a plurality of N power supplies modules, arbitrarily arranged in a sequence 1 through N, each of the N power supply modules having:
(i) an output connected in parallel to supply an output current to a load;
(ii) a nominal output voltage that is variable in response to a control signal; and
(iii) a rated power output greater than P/N, where P is the total power required by load;
(b) means for sensing a condition indicative of the output current of each of the power supply modules, thereby producing an output current signal for each power supply module that serves as a first order reference power supply module, each power supply module having a different first order reference power supply module that is proportional to its output current; and
(c) comparator means connected to each of the N power supply modules, for comparing the output current signal of each one of the power supply modules to the output current signal of at least an other of the N power supply modules, producing a difference signal proportional to the difference between the output currents of said one and at least said other of the power supply modules, and producing a plurality of control signals as a function of the difference signals, the control signs being connected to the power supply modules to control the output current provided by each of the N power supply modules, forcing the power supply modules to have substantially equal output voltages and substantially equal output currents, even upon failure of one or more of the power supply modules, so long as the rated capacity of any of the operating power supply modules is not exceeded.

9. The fault tolerant modular power system of claim 8, wherein J is an integer in the sequence 1 ... N, and wherein the comparator means are operative to produce a Jth control signal input to the Jth power supply module to control its output voltage to minimize the differential signal produced by comparison of its output current signal to that of: (i) the $J-1$ power supply module in the sequence if J does not equal 1, and (ii) the Nth power supply module in the sequence, if J equals 1.

10. The fault tolerant modular power system of claim 8, wherein the comparator means comprise a plurality of differential amplifiers, each having M input signals, where M is equal to at least 2, each differential amplifier being connected to receive the output current signals produced by the means for sensing output current, for selected power supply modules, and producing the control signal input to one of the power supply modules.

11. The fault tolerant modular power system of claim 8, wherein the comparator means comprise a plurality of differential amplifiers, each having M input signals, and wherein M is equal to 2, and wherein the sequence of power supply modules, 1 ... N, a first differential amplifier of the plurality of differential amplifiers is connected to receive the output current signals from the means for sensing output current of a first and a second power supply module in the sequence, a second differential amplifier of the plurality of differential amplifiers is connected to receive the output current signals from the means for sensing output current of the second and a third power supply module in the sequence, and others of the plurality of differential amplifiers are similarly each respectively connected to receive the output current signals from the means for sensing output current for each remaining successive pairs of power supply modules in the sequence, if any, including the Nth and the first.

12. The fault tolerant modular power system of claim 10, wherein $N-(M-1)$ power supply modules have a combined rated power output greater than P, so that the total power required by the load may be adequately provided by the remaining operating power supply modules in equal shares, if any $M-1$ power supply modules should fail.

13. The fault tolerant modular power system of claim 11, wherein an input to each of the plurality of differential amplifiers is connected to receive the output current signals from selected power supply modules, forming an interconnected loop, so that failure of any (M−1) power supply modules does not prevent the control signals from varying the output current of the power supply modules continuing to operate, in order to provide substantially equal output voltages and equal output currents, the differential amplifiers connected to receive the output current signals of failed power supply modules also being connected to receive the output current signals of other power supply modules prior to and following any failed power supply module in the sequence 1...N and N to 1.

14. The fault tolerant modular power system of claim 8, wherein the load comprises a plurality of distributed loads.

15. The fault tolerant modular power system of claim 8, further comprising means for limiting the range of the control signals produced by the comparator means between predetermined upper and lower limits.

16. In a power supply system including a plurality of power supply modules connected in parallel to provide an output current to a load, each power supply module having an output voltage variable about the same nominal value, a method for controlling the output current of the power supply modules so that they are substantially equal, comprising the steps of:
  (a) monitoring the output current of the plurality of power supply modules, producing signals indicative of said current;
  (b) comparing the signals indicative of the output currents of selected pairs of the plurality of power supply modules that serves as one power supply module of each selected pair comprising a first order reference power supply module, each selected pair having a different first order reference power supply module thereby producing a difference signal indicative of the relative magnitude of said output currents; and
  (c) adjusting the output voltages of each of the plurality of power supply modules in response to the difference signals, so that the output current of each of the plurality of power supply modules is equal to the output current of at least one other of the plurality of power supply modules, thereby causing the plurality of power supply modules to substantially equally share the total current supplied to the load and to have substantially equal output voltages.

17. The method of claim 16, wherein the step of adjusting the output voltages is limited to a difference signal within a predetermined range.

18. The method of claim 16, wherein the output current of each selected pair of power supply modules is monitored by measuring the voltage drop across a resistor that carries the output current of each of the selected pairs of power supply modules.

19. The method of claim 16, wherein the plurality of power supply modules are connected in a first closed loop circuit in which the selected pairs of power supply modules comprise successive power supply modules and in a second closed loop circuit in which the selected pairs of power supply modules skip every other power supply module in the first closed loop circuit, the step of comparing the signals indicative of the output currents comprising the steps of:
  (a) comparing the signals indicative of the output currents of the selected pairs of power supply modules connected in the first closed loop, and if one of the power supply modules of a selected pair in the first closed loop circuit has failed; and
  (b) comparing the signals indicative of the output currents of the selected pair of power supply modules of the second closed loop circuit that skips the failed power supply module in the first closed loop circuit.

20. The method of claim 16, wherein the plurality of power supply modules are connected in a plurality of closed loop circuits of increasing order, the selected pairs of the plurality of power supply modules in each of the plurality of closed loop circuits comprising different combinations of the plurality of power supply modules, further comprising the step of bypassing a failed power supply module by using a selected pair of power supply modules from a higher order closed loop circuit to produce the difference signal, said selected pair of power supply modules from the higher order closed loop circuit including a power supply module of a selected pair from a lower order closed loop circuit that includes the failed power supply module.

21. The method of claim 20, wherein there are N closed circuits, and wherein up to N of the plurality of power supply modules may fail without affecting the equal sharing of the total current supplied to the load, so long as the total current supplied to the load does not exceed the rated current capacity of the operating power supply modules.

* * * * *

UNITED STATES PATENT AND TRADEMARK OFFICE
CERTIFICATE OF CORRECTION

PATENT NO. : 4,877,972
DATED : October 31, 1989
INVENTOR(S) : Sobhani et al.

It is certified that error appears in the above-identified patent and that said Letters Patent is hereby corrected as shown below:

| Column | Line(s) | Error |
|---|---|---|
| 6 | 58 | "J+1" should be --J-1-- |
| 6 | 58 | "$I_{j+1}$" should be --$I_{j-1}$-- |
| 7 | 10 | "a" should be --A-- |
| 11 | 67-68 | After the word "modules," delete the word --thereby-- |
| 12 | 1-4 | After the word "module" delete --that serves as a first order reference power supply module, each power supply module having a different first order reference power supply module-- |
| 12 | 10 | After the word "modules" and before "," (comma) insert --that serves as a first order reference power supply module, each power supply module having a different first order reference power supply module-- |
| 12 | 10 | After "," (comma) insert --thereby-- |
| 12 | 15 | "signs" should be --signals-- |
| 13 | 42 | "magnitude" should be --magnitudes-- |

Signed and Sealed this

Twenty-fifth Day of September, 1990

Attest:

HARRY F. MANBECK, JR.

*Attesting Officer*   *Commissioner of Patents and Trademarks*